Patented Jan. 26, 1937

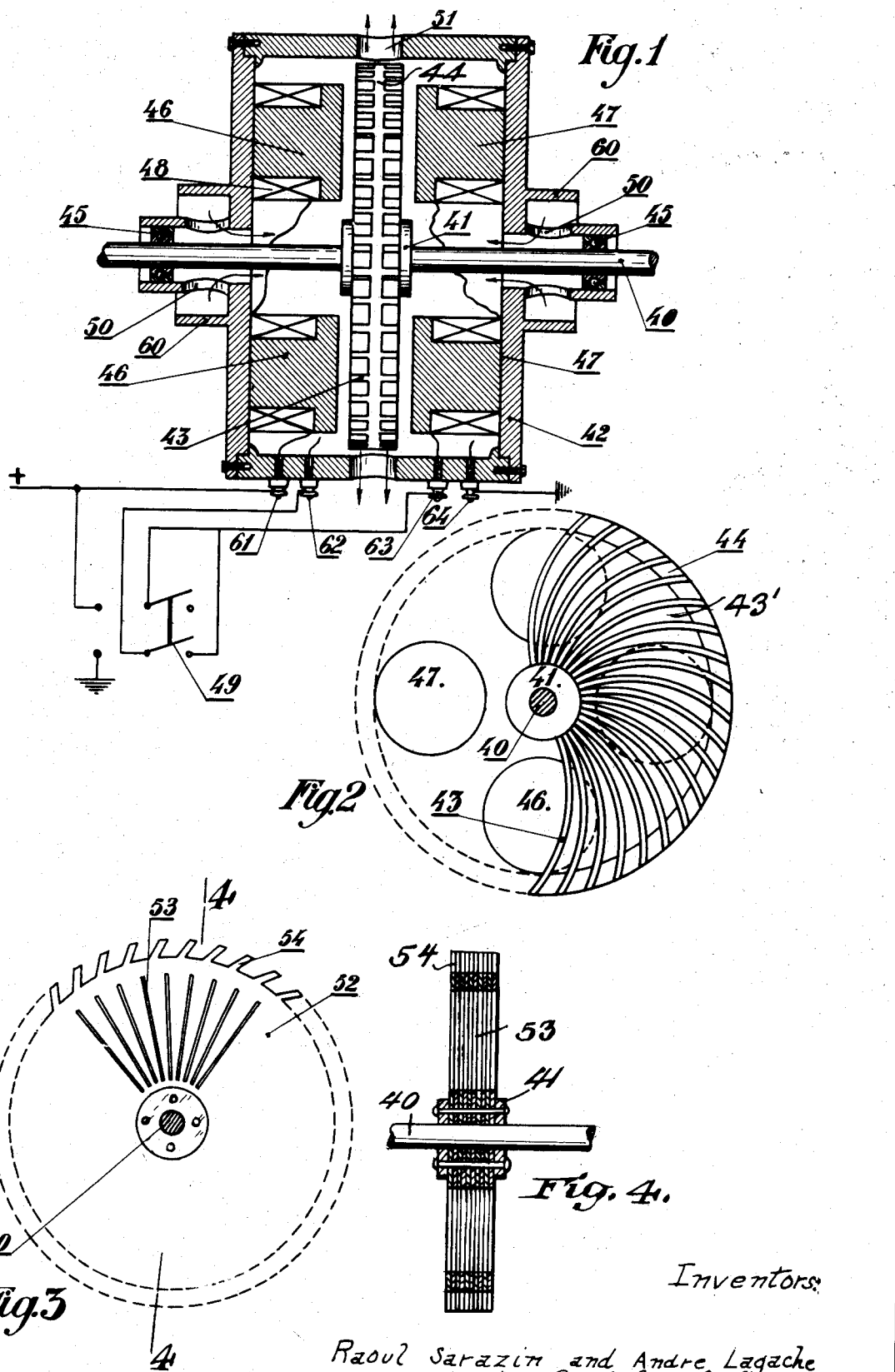

2,068,820

UNITED STATES PATENT OFFICE 2,068,820

ELECTRICAL DEVICE FOR THE ABSORPTION OF MECHANICAL ENERGY

Raoul Sarazin, Saint-Prix, and André Lagache, Argenteuil, France

Application November 23, 1934, Serial No. 754,532
In France December 7, 1933

10 Claims. (Cl. 188—104)

The present invention relates to an electrical device for absorbing and dissipating into the surrounding air in the form of heat the mechanical energy of a rotating shaft.

Such a device is more particularly applicable for braking the movement of a vehicle. Although it utilizes an electric current, the device differs from ordinary dynamo brakes in that it does not necessitate any resistance or any external electric circuit.

The device comprises a sort of flat rotor keyed on the shaft to be braked and constructed of preferably magnetic metal. The said rotor comprises in its plane a certain number of closed electric circuits provided for example by means of blades connected together by their ends or by means of juxtaposed discs pierced by radial slots, the said rotor being so adapted as to act as a fan element either by giving a suitable form to the blades which constitute it, or in the case of the discs by adding blades designed for the purpose to the said discs.

The device is completed by a magnetic casing securely fixed to the frame and comprising on either side of the rotor, pole-pieces provided with excitation windings and so adapted that, pole-pieces facing each other are of unlike polarity, the magnetic lines of force passing through the rotor parallel to the axis of rotation. Inlets or like orifices are provided in the vicinity of the hub and of the periphery of the casing to promote an intense circulation of the air during the rotation of the rotor.

It will be appreciated that this rotation produces, in the closed circuits which cut the lines of force, considerable electrical circulation currents which absorb an intense energy and dissipate it in the form of heat thereby producing the desired braking effect.

The electro-magnetic excitation of the pole-pieces is ensured by an external source of electricity and the braking may be regulated very easily to the desired value without operating any mechanical elements other than the movable member of a switch.

The invention is illustrated by way of example in the accompanying drawing, in which:

Figure 1 is a longitudinal section of a form of construction of the device.

Figure 2 is a view of the rotor and field elements on a plane perpendicular to the axis of the shaft with certain parts omitted.

Figure 3 is a similar view of a modification of the rotor.

Figure 4 is a sectional view taken on line 4—4 of Figure 3.

Referring to Figures 1 and 2, at 40 is shown the shaft which transmits the energy to be absorbed. The said shaft may be for example the transmission shaft of a motor vehicle.

On the shaft 40 is keyed by means of the hub 41 a rotor formed of a large number of suitably curved blades such as 43 having their ends connected together by a rim 44. If two consecutive blades are considered, it will thus be seen that they form a true closed circuit with the rim 44 and the hub 41.

Figure 1 shows that the width of each blade is distinctly greater than the thickness of the rim and thus leaves a free passage 43' for the air.

The rotor thus constructed is enclosed in a magnetic casing 42 fixed to the vehicle frame or chassis by any appropriate means (not shown), such as collars, flanges, lugs and so forth. In order to insure accurate centering of the casing 42, ball bearings 45 are interposed between the said casing and the shaft 40.

In the interior of the casing 42 there are provided a certain number of pole-pieces, eight in the example shown, denoted by 46 and 47 according as to whether their polarity is north or south, respectively. The said pole-pieces are distributed face to face on either side of the rotor, and their active faces are parallel to the median plane of the said rotor. Finally, provision is made such that the polarities of two pole-pieces facing each other are unlike, so that the lines of force passing from one to the other pass through the rotor.

The excitation of the pole-pieces 46 or 47 is insured by field windings such as 48 distributed in two groups, one of which ends at two insulated terminals 61 and 62 and the other at an insulated terminal 63 and an earthing terminal 64.

The terminal 61 is permanently connected to one of the poles of a source of electricity, the other pole of which is connected to earth. Finally, the terminals 61, 62 and 63 are connected in the manner shown to a switch 49 which, according to the position of its movable member, connects the two groups of field windings, either in series (right-hand position) or in parallel (left-hand position).

The casing 42 comprises in the vicinity of the shaft 40, air inlets and orifices 50 protected by flanges 60, and on its periphery in the plane of the rotor other orifices 51. It will be noted that the openings 50 are located adjacent the bearings 45. This produces a cooling effect on the bearings which is very helpful. It is desirable that the bearings should be located as close to the brake disc as possible, so as to insure proper centering of the disc relative to the magnets and to prevent bending of the shaft. On the other hand, since the disc becomes very hot, it has heretofore been impossible to locate the bearings as close to the disc as desirable since they were so heated as to create considerable damage. By locating the openings adjacent the bearings, the air is drawn past the bearings to cool the same, and the annular walls 60 emphasize this since they practically force the air to flow very close to the bearings.

Assuming that the current feeding the windings 48 is zero, the induction in the pole-pieces 46 and 47 is negligible, as is also the field passing through the rotor. If, therefore, the shaft 40 is caused to rotate, the only work which it produces consists in aspirating air, in the manner of a fan rotor, through the orifices 50 and in expelling the said air through the orifices 51.

The power consumed is negligible and the no-load efficiency of the device is excellent, but as soon as an electric current flows through the windings 48, the numerous electric circuits formed by the successive blades 43, connected together by the hub 41 and the rim 44 cut normally and at a high speed the magnetic lines of force connecting the various pole-pieces facing each other. The said circuits then become the seat of intense electric currents which, by Joule effect, heat the rotor and, particularly the blades 43 considerably, but by reason of the active circulation of air between the said blades, the heat is rapidly expelled to the exterior with the hot air escaping through the orifices 51, such that the temperature of the rotor soon reaches a constant value.

The heat thus dissipated constitutes the energy absorbed by the device and provides in a convenient manner the required braking of the shaft 40.

It should be remarked that, due to the unlike polarities of the successive poles 46 and 47, the variation of the flux to which any region of the rotor whatsoever is subject is a maximum, since the flux is alternatively positive and negative.

The switch 49 renders it possible to pass through the winding 48 either a normal current (connection in series) for slow braking, or a double current (connection in parallel) for very powerful braking.

It will obviously be appreciated that the braking produced increases relatively to the intensity of the excitation current.

In order to increase the value of the field in the air gap between the pole-pieces facing each other it is preferable to construct the blades 43 of metal having a high magnetic permeability, mild steel or iron for example.

These materials have the additional advantage of producing the "skin effect", that is to say, the surface localization of the induced currents when the frequency increases, thereby tending to maintain constant the braking couple, despite the variations in speed of the vehicle. Finally, mild steel and iron have an excellent mechanical resistance and a high melting point.

Since the rotor is composed of elements which are solely metallic, its temperature may rise without disadvantage to several hundred degrees, so that the device according to the invention possesses a considerable absorption capacity relatively to its weight and dimensions. When the temperature of the rotor exceeds 750°, the magnetic properties of the iron disappear and the induction field diminishes considerably, thus providing an automatic temperature regulation.

The modification of the rotor shown in Figures 3 and 4 is composed of a series of juxtaposed discs 52 made of mild steel, and fixed to the hub 41 which in turn is keyed to the shaft 40.

In the discs 52 are provided a certain number of radial slots 53 which do not extend to the periphery of the disc, so that the contour of each of the slots forms a closed electric circuit equivalent to that formed by two successive blades 43, according to Figure 2.

The disc 52 is toothed on its periphery so as to form blade elements 54 insuring a driving of air by the centrifugal force as in the first form of construction.

Furthermore, it should be understood that the invention is not limited to the two examples which have just been mentioned, and that it is possible to adopt according to circumstances, any form of rotor capable, when it rotates in a magnetic field normal to its plane, of giving rise to circulation air currents of such a nature as to dissipate a large quantity of energy. More particularly, it may be solid and may or may not comprise cooling fins on its periphery.

We claim:

1. An electromagnetic brake comprising a casing of magnetic metal, a shaft journalled in the casing, a disc-shaped rotor of metal fixed on the shaft inside the casing, said rotor having recesses in both faces forming air agitating means, and pole pieces in the casing extending parallel to the shaft and arranged with co-operating poles of different polarity adjacent opposite faces of the rotor disc, said casing having inlet and outlet openings near the center and periphery, respectively, of the rotor co-operating with the air agitating means on the rotor to produce air currents through the casing on both sides of the rotor.

2. An electromagnetic brake comprising a casing of magnetic metal, a shaft journaled in the casing, a disc-shaped rotor of metal fixed on the shaft inside the casing, and pole pieces in the casing extending parallel to the shaft and arranged with co-operating poles of different polarity adjacent opposite faces of the rotor disc, said rotor being formed of laminations with radial slots therein providing in each lamination a series of closed electric circuits in the metal thereof.

3. An electro-magnetic brake comprising, in combination, a support, two sets of electromagnets fixed to said support, an air gap between said sets of electromagnets, a shaft journaled in said support, a metallic rotor located in said air gap and fixed to said shaft, said rotor comprising a hub, a rim and a plurality of curved blades between said hub and said rim and forming openings between them.

4. An electro-magnetic brake comprising, in combination, a support, two sets of electromagnets fixed to said support, an air gap between said sets of electromagnets, a shaft journalled in said support, a disk-shaped metallic rotor located in said air gap and fixed on said shaft, openings extending substantially radially in said rotor and blades on the periphery of said rotor.

5. An electro-magnetic brake comprising, in combination, a support, two sets of electromagnets fixed to said support, an air gap between said sets of electromagnets, a shaft journaled in said support, a disk-shaped rotor of metal located in said air gap and fixed on said shaft, said rotor producing outwardly flowing air currents upon rotation thereof, said support having inlet openings near its center at both sides of said rotor, and outlet openings at its periphery adjacent the plane of rotation of said rotor, so as to produce air currents on both sides of the rotor.

6. An electro-magnetic brake comprising, in combination, a casing, two sets of electromagnets fixed to said casing, an air gap between said sets of electromagnets, a shaft journaled in said casing, a disk-shaped rotor of metal located in said air gap and fixed on said shaft, said rotor producing outwardly flowing air currents upon rotation thereof, said casing having inlet openings near its center at both sides of said rotor, and outlet openings at its periphery adjacent the plane of rotation of said rotor, so as to produce air currents on both sides of the rotor.

7. An electromagnetic brake comprising in combination, a casing, an electromagnet fixed in said casing, bearings carried by said casing, a shaft mounted in said bearings, a rotor mounted on said shaft to cooperate with said electromagnet, said casing having openings therein and said rotor being adapted to create a current of air through said openings, some of said openings being located adjacent the bearings to cool the same.

8. An electromagnetic brake comprising, in combination, a casing, an electromagnet fixed in said casing, bearings carried by said casing, a shaft mounted in said bearings, a rotor mounted on said shaft to cooperate with said electromagnet, said casing having inlet openings therein adjacent the bearings and outlet openings adjacent the plane of rotation of the rotor, whereby the rotor causes a current of air through the casing to cool the bearings and the rotor.

9. An electromagnetic brake comprising, in combination, a casing, an electromagnet fixed in said casing, said casing having cylindrical projections at opposite sides thereof, bearings mounted in said projections, a shaft mounted in said bearings, a rotor mounted on said shaft to cooperate with said electromagnet, said casing having openings therein adjacent the plane of rotation of the rotor and said projection having openings therein between the bearings and the casing, whereby said rotor creates a current of air through the casing to cool the bearings and the rotor.

10. In a device as claimed in claim 9, annular walls surrounding the projections to guide the air over the bearings.

RAOUL SARAZIN.
ANDRÉ LAGACHE.